United States Patent [19]
Hamada et al.

[11] Patent Number: 4,889,353
[45] Date of Patent: Dec. 26, 1989

[54] DIRECTION-DEPENDENT POWER TRANSMISSION SYSTEM

[75] Inventors: Tetsuro Hamada; Kazuhiko Shimada; Katsuhiko Masuda; Kazunori Shibuya, all of Saitama, Japan

[73] Assignee: Honda Giken Kogyo K.K., Japan

[21] Appl. No.: 148,804

[22] Filed: Jan. 27, 1988

[30] Foreign Application Priority Data

Jan. 28, 1987 [JP] Japan .................. 62-017732

[51] Int. Cl.$^4$ .................. B60K 17/34; F16D 11/06
[52] U.S. Cl. .................. 180/233; 180/248; 192/48.92; 192/51
[58] Field of Search .................. 180/233, 248, 249, 250; 192/48, 92, 51, 103 R, 41 A

[56] References Cited

U.S. PATENT DOCUMENTS 3,165,183  1/1965  Clements .................. 192/48.92 X
4,185,723  1/1980  Kelbel .................. 192/48.92 X

FOREIGN PATENT DOCUMENTS 59-188731  5/1983  Japan .................. 180/248

Primary Examiner—John A. Pekar
Attorney, Agent, or Firm—Skjerven, Morrill MacPherson, Franklin & Friel

[57] ABSTRACT

To the end of eliminating the problems arising from substantially rigid connection between a front wheel set and a rear wheel set in a four-wheel drive vehicle, there is provided a power transmission system in which a speed-dependent power transmission device is provided between the front wheel set and the rear wheel set so that both the wheel sets are substantially rigidly connected to each other in a low speed range and rotational power is transmitted only from the front wheel set to the rear wheel set in a high speed range. The power transmission device of this kind can be conveniently formed by a pair of one-way clutch elements which are connected between an input member and an output member in a mutually parallel relationship; one of the one-way clutch elements transmitting power from the input member to the output member in both the high and the low speed range while the other one-way clutch element transmits power only from the output member to the input member in the low speed range but does not transmit power in either direction in the high speed range. This speed-dependency can be accomplished by using one-way clutch sprag elements each having a gravitational center offset from its center of rolling motion for wedging between the input member and the output member.

9 Claims, 5 Drawing Sheets

DIRECTION-DEPENDENT POWER TRANSMISSION SYSTEM

TECHNICAL FIELD

The present invention relates to a power transmission system and in particular to such a power transmission system which is suitable for use in a four-wheel drive vehicle and other vehicles in which more than two wheel sets are power driven at the same time.

BACKGROUND OF THE INVENTION

Various forms of four-wheel drive vehicles have been proposed and many of them have already been put to actual uses. They can be generally grouped into those which are called as full-time four-wheel drive vehicles and those which are called as part-time four-wheel drive vehicles. In a full-time four-wheel drive vehicle, both the front wheels and the rear wheels are always power driven, typically by way of a central mechanical differential device. Alternatively, a viscous coupling which transmits torque substantially in proportion to the difference in the rotational speeds of its input member and output member may be interposed in the path of power transmission between the front wheel set and the rear wheel set in order to achieve a four-wheel drive. On the other hand, in a part-time four-wheel drive vehicle, either the front wheels or the rear wheels are normally not power driven at all but all the wheels are power driven typically by rigidly connecting the front wheel set and the rear wheel set together only when so selected by the driver. In some of the full-time four-wheel drive vehicles, the central differential device is provided with a lock mechanism for selective rigid locking up of the differential device to improve the capability of the vehicle to run on a frozen, muddy or otherwise slippery road surface.

In either case, it could happen for the front wheel set and the rear wheel set to be rigidly connected to each other. When that is the case, the braking force applied to one of the wheel sets is directly transmitted to the other wheel set. However, it is more desirable to have the front wheel set experience a greater braking force than the rear wheel set as is the case in most four-wheel vehicles for a balanced braking action and the rigid connection between the front wheel set and the rear wheel set causes the braking force to be evenly distributed between the front wheel set and the rear wheel set.

In order to eliminate this problem, Japanese Utility Model Laid-Open Publication No. 59-188731 (corresponding to German Patent Application P No. 33 17 247.1 and U.S. Pat. No. 4,605,087) proposed provision of a freewheel device in the path of power transmission between the front wheel set and the rear wheel set to the end of blocking the transmission of braking force from the front wheel set to the rear wheel set. However, according to this proposal, the braking force of the engine brake is also not transmitted to the rear wheel set. Thus, the advantage of four-wheel drive will be lost for instance when the vehicle goes down a slippery slope, since the braking force of the engine brake will not be transmitted to the rear wheels. Furthermore, when the vehicle goes backward, power will not be transmitted to the rear wheel set and, therefore, it will be necessary to provide a manual lock mechanism for locking up the freewheel device in view of the possibility of advancing backward in a muddy or otherwise slippery terrain.

BRIEF SUMMARY OF THE INVENTION

In view of these and other problems of the prior art, a primary object of the present invention is to provide a power transmission system which is suitable for use in a four-wheel drive vehicle in which the braking force is transmitted to the rear wheels when required and the advantages of four-wheel drive are maintained at all times.

A second object of the present invention is to provide a power transmission system for a four-wheel drive vehicle in which the braking force is transmitted from the front wheel set to the rear wheel set only when the speed of the vehicle is less than a certain value.

A third object of the present invention is to provide a power transmission system for a four-wheel drive vehicle which maintains the advantages of four-wheel drive even when the vehicle advances backward.

A fourth object of the present invention is to provide a power transmission device which achieves a key function in a power transmission system of the above mentioned kind.

These and other objects of the present invention will be accomplished by providing a power transmission device for transmitting rotational power between a rotating input member and a rotating output member; comprising a one-way clutch means which transmits rotational power both ways between the input member and the output member in a low speed range and transmits rotational power only from the input member to the output member in a high speed range.

Thus, by using this device, in the low speed range, the advantages of the four-wheel drive can be obtained and the braking force arising from either a brake device or the engine brake can be transmitted to all the wheels for effective braking action. Here, it should be noted that the transmission of braking force from the engine to the rear wheels is equivalent to the transmission of drive force from the rear wheels to the engine (engine brake) or to a brake device for the front wheels (normal braking). On the other hand, in the high speed range, the braking force applied to the front wheel set is prevented from being transmitted to the rear wheels so as to maintain a stable condition of the vehicle even when an abrupt braking is applied to the vehicle.

According to a preferred embodiment of the power transmission device according to the present invention, the power transmission device comprises a pair of one-way clutch elements which are connected between the input member and the output member in a mutually parallel relationship; one of the one-way clutch elements transmitting power from the input member to the output member in both the high and the low speed range while the other one-way clutch element transmits power only from the output member to the input member in the low speed range but does not transmit power in either direction in the high speed range. Preferably, the other one-way clutch element comprises a sprag means which roll between the input member and the output member so as to wedge between them when the output member drives the input member; a gravitational center of the sprag means being offset from a center of the rolling motion of the sprag means in such a manner that a centrifugal force acting upon the gravitational center of the sprag means urges the sprag means to keep it from wedging between the input member and the output member in the high speed range.

According to a preferred embodiment of the power transmission system according to the present invention, a power transmission device of the above described kind is connected in series with a power splitting means in a path of power transmission between the front wheel set and the rear wheel set of the vehicle. Preferably, the power splitting means consists of a viscous coupling of a type having a single input and a single output or, alternatively, a single input and a pair of outputs so as to perform the function of a differential device as well as viscous coupling connecting the front wheel set and the rear wheel set together.

According to a certain aspect of the present invention, a power transmission device of the above described kind is connected in a path of power transmission between the power source and the rear wheel set, preferably in series with a viscous coupling means.

BRIEF DESCRIPTION OF THE DRAWINGS

The above-mentioned and other features and objects of this invention and the manner of obtaining them will become more apparent and the invention itself will be better understood by reference to the following description of embodiments of this invention taken in conjunction with the accompanying drawings, in which.

DETAILED DESCRIPTION OF THE PREFERRED EMBODIMENTS

Figure 1:
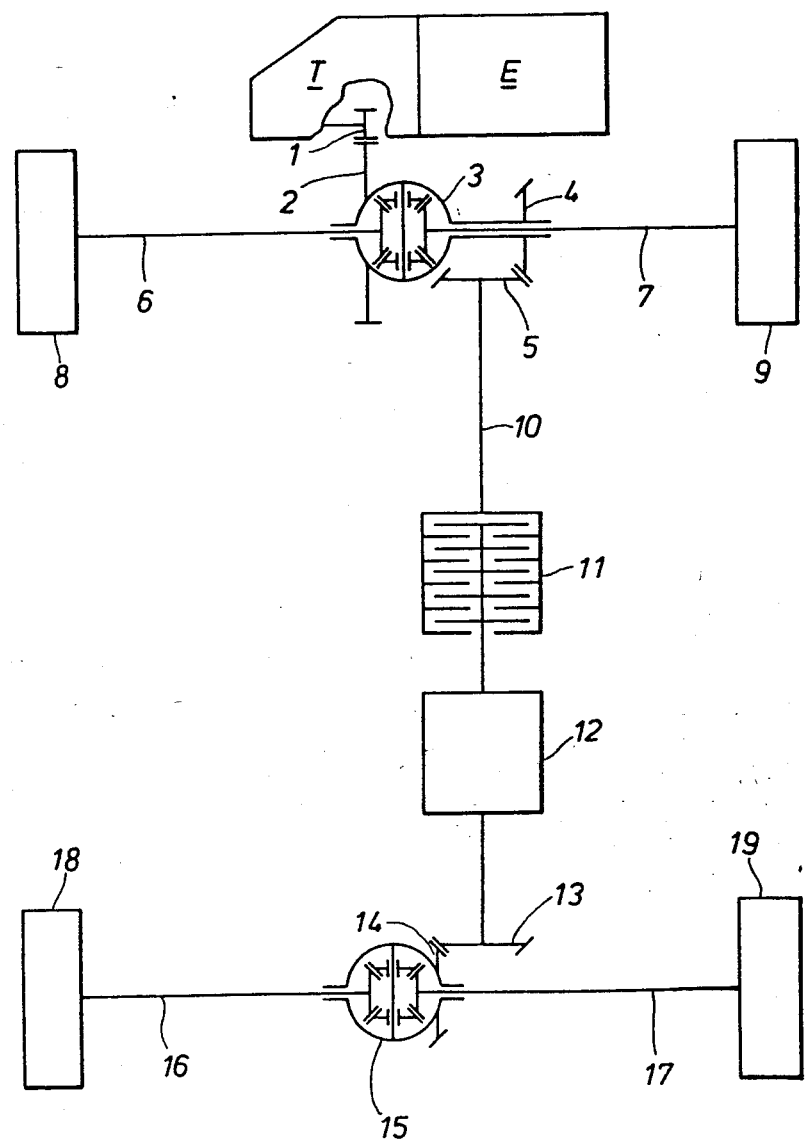
FIG. 1 is a skeleton diagram of a first embodiment of the power transmission system for a vehicle according to the present invention.

FIG. 1 is a skeleton diagram of an embodiment of the power transmission system for a four-wheel drive vehicle according to the present invention. The power from an engine E is transmitted to an input end of a differential device 3 for front wheels by way of a transmission device T and spur gears 1 and 2. Output ends of this differential device 3 are connected to the right and the left front wheel 8 and 9 of the vehicle by way of axles 6 and 7 in a conventional manner.

The input end of the differential device 3 is also connected to an input end of a viscous coupling 11 by way of conical gears 4 and 5 and a propeller shaft 10. An output end of the viscous coupling 11 is connected to an input end of a power transmission device 12 which is described hereinafter, and an output end of the power transmission device 12 is connected to an input end of a differential device 15 for rear wheels 18 and 19 by way of conical gears 13 and 14. Output ends of the differential device 15 are connected to the right and the left front wheel 18 and 19 of the vehicle by way of axles 16 and 17.

Figure 2:
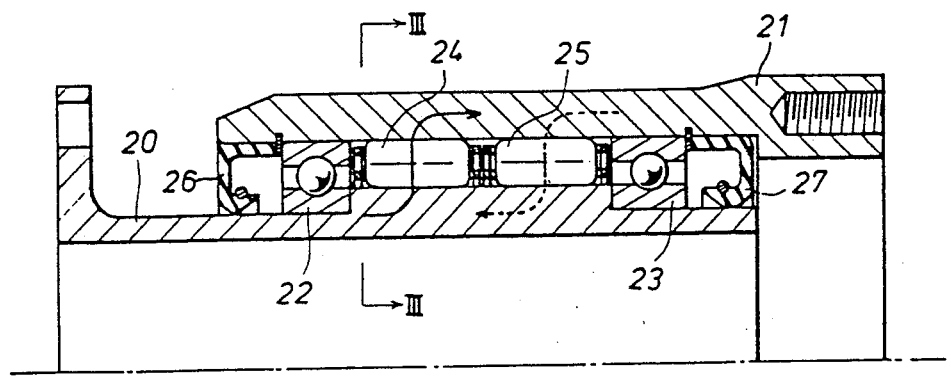
FIG. 2 is a sectional view of the power transmission device used in the embodiment shown in FIG. 1.
Figure 3:
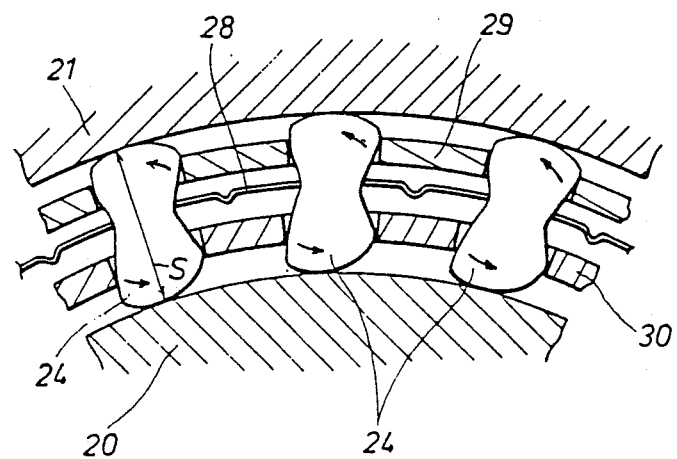
FIG. 3 is a magnified sectional view showing some of the sprags of one of the two sprag sets taken along line III—III of FIG. 2.

As shown in FIGS. 2 and 3, the power transmission device 12 is provided with a tubular input member 20 which is connected to the output end of the viscous coupling 11 and a tubular output member 21 which coaxially surrounds the input member 20 and is connected to the conical gear 13. Thus, an annular space is defined between the input member 20 and the output member 21 and ball bearings 22 and 23 are interposed between them at either longitudinal end thereof. Seal members 26 and 27 are fitted into the annular space from outer most longitudinal ends thereof. Additionally, two sets of sprags 24 and 25 are provided in the annular space between the ball bearings 22 and 23, with the sprags 24 and 25 arranged at equal intervals along the circumferential direction in two rows which are spaced from each other along the longitudinal direction. Each of the sprags 24 and 25 is provided with a pair of substantially semicylindrical surfaces at each radial end and a narrower middle part.

The sprags 24 and 25 are thus interposed between the outer circumferential surface of the input member 20 and the inner circumferential surface of the output member 21 with the semi-cylindrical surfaces of the sprags contacting the corresponding circumferential surfaces of the input member and the output member. The distance between the points of contact of each of the sprags or the strut S increases and decreases as the sprag rolls over the outer circumferential surface of the input member 20 and the inner circumferential surface of the output member 21 as a result of a relative rotation between the input member 20 and the output member 21. The ribbon springs 28, which are arranged between adjacent sprags, urge the sprags in the direction to increase their struts S as indicated by the solid arrows in FIG. 3. Retaining rings 29 and 30 are provided for synchronizing the rolling motion of the sprags.

Thus, as the input member 20 is turned in clockwise direction (forward drive) in FIG. 3, the sprags 24 roll in the direction to increase their struts S and power is transmitted from the input member 20 to the output member 21 by way of the sprags 24. Conversely, as the output member 21 is turned in clockwise direction (forward engine brake) in FIG. 3, the struts S of the sprags 24 are reduced and power is not transmitted from the output member 21 to the input member 20. In this sense, the sprags 24 form a one-way clutch in cooperation with the input member 20 and the output member 21. However, when the rotational direction is reversed (reverse drive and reverse engine brake), the direction of power transmission is reversed as a matter of general behavior of a one-way clutch.

The sprags 25 are similar to the sprags 24 in their arrangement and their individual configuration but they are arranged so that the directions of their rolling motion for increasing and decreasing their struts S are reversed. Therefore, as the input member 20 is turned in clockwise direction (forward drive) in FIG. 4, the sprags 25 roll in the direction to decrease their struts S and power is not transmitted from the input member 20 to the output member 21 by way of the sprags 25. Conversely, as the output member 21 is turned in clockwise direction (forward engine brake) in FIG. 4, the struts S of the sprags 25 are increased and power is transmitted from the output member 21 to the input member 20. In this sense, the sprags 25 form a one-way clutch in cooperation with the input member 20 and the output member 21. However, when the rotational direction is reversed (reverse drive and reverse engine brake), the direction of power transmission is reversed as a matter of general behavior of a one-way clutch.

The one-way clutch formed by the sprags 24 is an ordinary one-way clutch and its action is not altered even when the rotational speed thereof is increased or decreased. However, in the one-way clutch formed by the sprags 25, since the gravitational center G (FIG. 4) of each of the sprags 25 is intentionally offset from a rotational center O of the rolling motion of the sprags 25, each of the sprags 25 is urged in the direction to reduced its strut S as the rotational speed of the sprags around the rotational center of the input member 20 and the output member 21 is increased. Therefore, when the rotational speed of either the input member 20 or the output member 21 is increased beyond a certain value, each of the sprags 25, which are dragged to the input member 20 and/or the output member 21, receives a centrifugal force which tends to reduce its strut S and power is not transmitted in either direction between the input member 20 and the output member 21.

Figure 4:
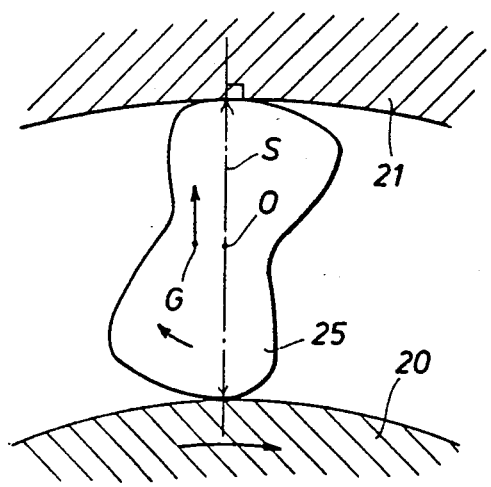
FIG. 4 is a magnified sectional view showing one of the sprags of the other sprag sets shown in FIG. 2 with other parts partly omitted for clarity of illustration.
Figure 5:
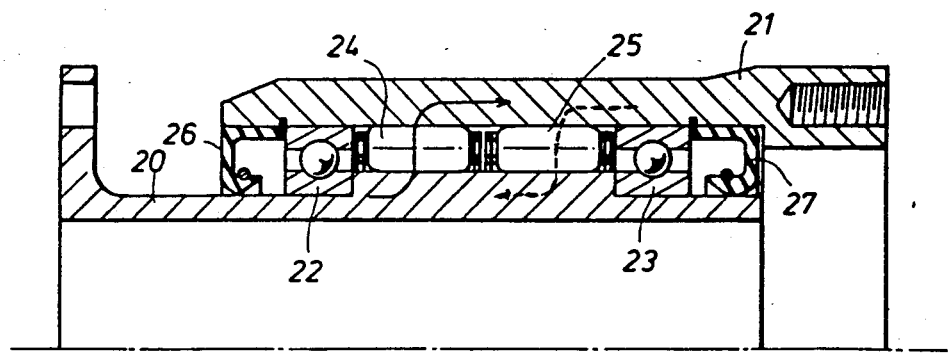
FIG. 5 is a view similar to FIG. 2 showing a different mode of power transmission.

In other words, in a low speed range, power in clockwise direction as seen in FIGS. 3 and 4 is transmitted between the input member 20 and the output member 21 in both directions by way of the sprags 24 and the sprags 25 as shown in FIG. 2, but, in a high speed range, power in a clockwise direction is transmitted only from the input member 20 to the output member 21 as shown in FIG. 5. In FIGS. 2 and 5, the path of power transmission of clockwise rotation from the input member to the output member is denoted with solid arrows while the path of power transmission of clockwise rotation from the output member to the input member is denoted with dotted arrows.

When the rotational direction is reversed or when the vehicle goes backward, the path of power transmission is reversed. In other words, in a low speed range, power in a counter-clockwise direction as seen in FIGS. 3 and 4 is transmitted between the input member 20 and the output member 21 in both directions by way of the sprags 24 and the sprags 25, respectively, but, in a high speed range, power in counter-clockwise direction is transmitted only from the output member 21 to the input member 20. Therefore, in the high speed range, one of the wheel sets, for instance, the rear wheels, is not power driven but it presents no practical problem since it is inconceivable for a vehicle to run backward at a high speed and, yet, all the wheels are required to be power driven.

Thus, when the vehicle is running forward at a relatively low speed, power from the engine E is transmitted to the rear wheels 18 and 19 by way of the sprags 24. When braking force is applied to the front wheels 8 and 9 or when the throttle valve of the engine is closed and the engine becomes a drag to the progress of the vehicle, the braking force is transmitted to the rear wheels 18 and 19 by way of the propeller shaft 10 and the viscous coupling 11, since it is equivalent to the case where the rear wheels 18 and 19 are driven by the road surface and this driving power is transmitted from the rear wheels to the front wheels or to the engine by way of the sprags 25. Therefore, the braking force of both a brake device and the engine brake in the low speed range is effectively transmitted to the rear wheels 17 and 18. Additionally, when the vehicle is going backward, the backward drive force in a low speed range is transmitted from the engine E to the rear wheels 18 and 19 by way of the sprags 25. Likewise, the braking force when the vehicle is going backward is transmitted to the rear wheels 18 and 19 by way of the sprags 24.

On the other hand, in a high speed range, since the sprags 25 are urged by the centrifugal force which tends to permit free rotation between the input member 20 and the output member 21, the forward drive power from the engine E is transmitted to the rear wheels 18 and 19 but the transmission of the brake force applied to the front wheels 8 and 9 or, in other words, the transmission of the drive force which the rear wheels 18 and 19 receive from the road surface to the front wheels 8 and 9 is interrupted by the action of the one-way clutch associated with the sprags 25. Therefore, in the high speed range, the brake force which may lock up the front wheels is not transmitted to the rear wheels and the lateral stability of the vehicle in undergoing a sudden braking action at high speed is assured. In the high speed range, the backward drive force is not transmitted to the rear wheels 18 and 19 but it presents no practical disadvantages as mentioned earlier.

Figure 6:
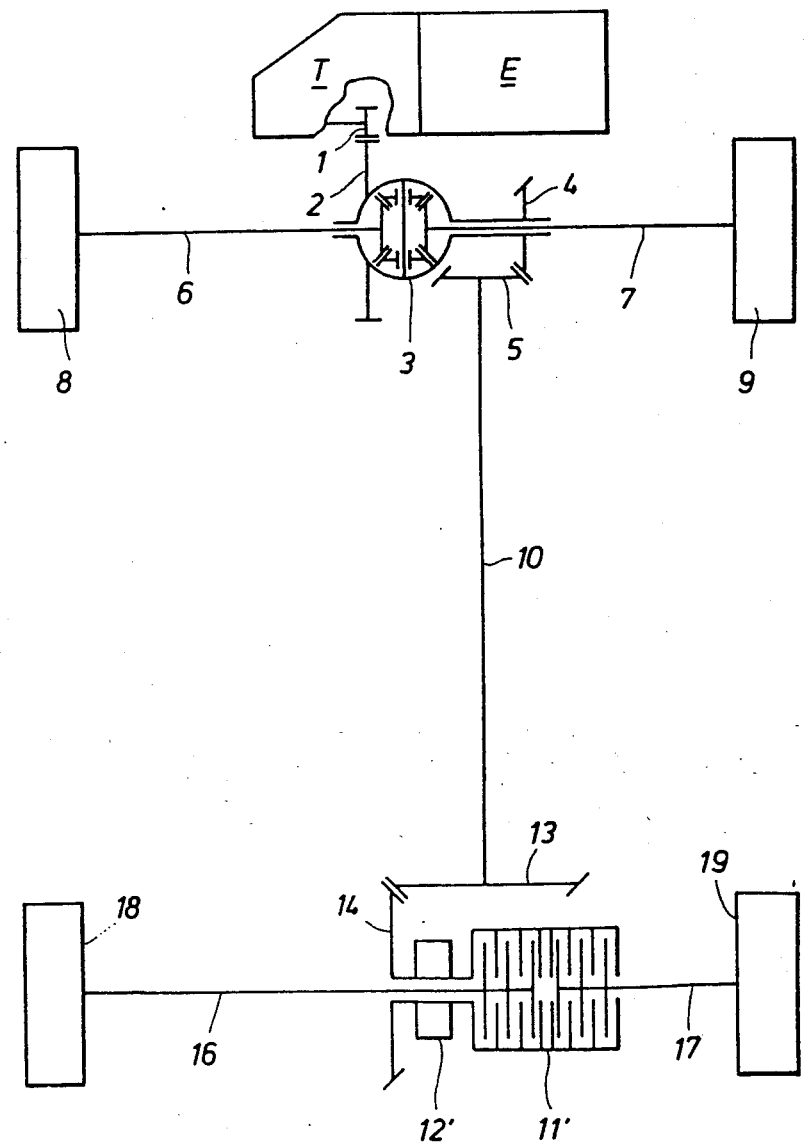
FIG. 6 is a view similar to FIG. 1 showing a second embodiment of the power transmission system according to the present invention.
Figure 7:
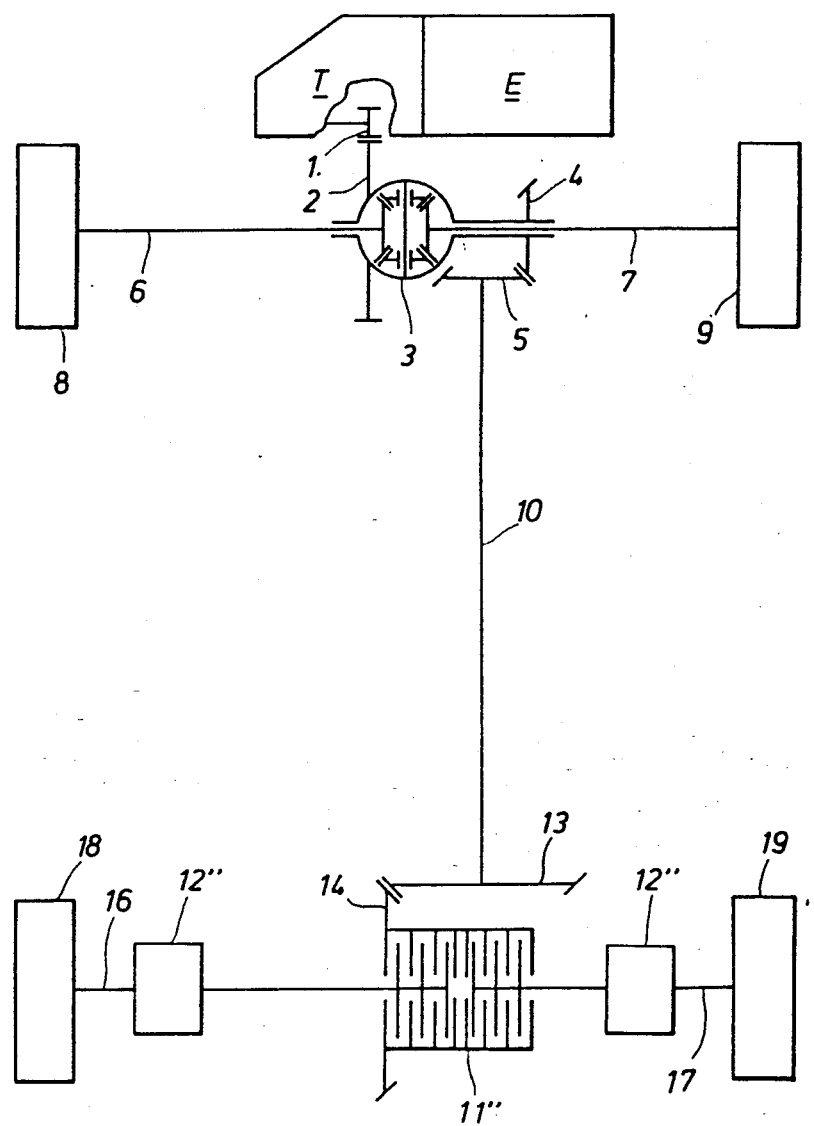
FIG. 7 is a view similar to FIG. 1 showing a third embodiment of the power transmission system according to the present invention.

FIGS. 6 and 7 show a second and a third embodiment of the power transmission system according to the present invention. In FIGS. 6 and 7, those parts corresponding to the various parts of the embodiment of FIG. 1 are denoted with like numerals and their detailed description is omitted.

In the embodiment shown in FIG. 6, the rear end of the propeller shaft 10 is connected to a pair of conical gears 13 and 14 for transmitting power from the engine E to a power transmission device 12', which is similar to the power transmission device 12 shown in FIGS. 2 to 5, having an input shaft and an output shaft which are coaxial with the axles 16 and 17 of the rear wheels 18 and 19. The output shaft of the power transmission device 12' is connected to a casing of a viscous coupling 11' which splits the power transmitted to its casing to the axles 16 and 17.

In the embodiment shown in FIG. 7, the rear end of the propeller shaft 10 is connected to a casing of a viscous coupling 11" which is similar to the viscous coupling 11' shown in FIG. 6 by way of a pair of conical gears 13 and 14. The two output ends of the viscous coupling 11" are connected to the axles 16 and 17 of the rear wheels 18 and 19, respectively, by way of individual power transmission devices 12" and 12" which are similar to the power transmission device 12 shown in FIGS. 2 to 5.

Thus, according to the present invention, the dynamic behavior of a four-wheel drive vehicle using a viscous coupling can be improved simply by adding a power transmission device which transmits power both ways in a low speed range but transmits power only in one direction in a high speed range.

Although the present invention has been described and shown in connection with vehicles in which the front wheels are directly driven by an engine while the rear wheels are driven by the engine by way of a viscous coupling, the present invention can be equally applied to those vehicle in which the rear wheels are directly driven by an engine while the front wheels are driven by the engine by way of a viscous coupling. Further, the power splitting means is not limited to the viscous couplings of the types mentioned above but may also be other power splitting means which permit transmission of braking force from the front wheels to the rear wheels. Yet further, the one-way clutch means is not limited to the kind described above but may also be those which are actuated by other mechanical means, electronic means or hydraulic means without departing from the spirit of the present invention.

What we claim is:

1. A power transmission device for transmitting rotational power between a rotating input member and a rotating output member; comprising a one-way clutch means which transmits rotational power both ways between the input member and the output member in a low speed range and transmits rotational power only from the input member to the output member in a high speed range.

2. A power transmission device as defined in claim 1, wherein the one-way clutch means comprises a pair of one-way clutch elements which are connected between the input-member and the output member in a mutually parallel relationship; one of the one-way clutch elements transmitting power from the input member to the output member in both the high and the low speed range while the other one-way clutch element transmits power only from the output member to the input member in the low speed range but does not transmit power in either direction in the high speed range.

3. A power transmission device as defined in claim 2, wherein the other one-way clutch element comprises a sprag means which rolls between the input member and the output member so as to wedge between them when the output member drives the input member; a gravitational center of the sprag means being offset from a center of the rolling motion of the sprag means in such a manner that a centrifugal force acting upon the gravitational center of the sprag means urges the sprag means to keep it from wedging between the input member and the output member in the high speed range.

4. A power transmission system for a vehicle having at least a front wheel set and a rear wheel set which are driven by a common power source, comprising:
a one-way clutch means which transmits rotational power both ways between its input member and its output member in a low speed range and transmits rotational power only from the input member to the output member in a high speed range; and
a power splitting means for splitting power from the common power source between the front wheel set and the rear wheel set;
the one-way clutch means and the power splitting means being connected in series in a path of power transmission between the front wheel set and the rear wheel set.

5. A power transmission system as defined in claim 4, wherein the power splitting means comprises a viscous coupling which is connected between input ends of a pair of differential devices for the front wheel set and the rear wheel set, respectively.

6. A power transmission system as defined in claim 4, wherein the power splitting means comprises a viscous coupling having an input end which is connected to the power source and a pair of output ends which are connected to axles of one of the wheel sets; the one-way clutch means being connected between the power source and the input end of the viscous coupling means.

7. A power transmission system as defined in claim 4, wherein the power splitting means comprises a viscous coupling having an input end which is connected to the power source and a pair of output ends which are connected to axles of one of the wheel sets; the one-way clutch means being connected between each of the output ends of the viscous coupling means and an axle of a corresponding wheel.

8. A power transmission system for a vehicle having at least a front wheel set and a rear wheel set which are driven by a common power source, comprising:
a one-way clutch means which transmits rotational power both ways between its input member and its output member in a low speed range and transmits rotational power only from the input member to the output member in a high speed range;
the one-way clutch means being connected in a path of power transmission between the power source and the rear wheel set.

9. A power transmission system as defined in claim 8, wherein a viscous coupling means is connected in series with the one-way clutch means in the path of power transmission between the power source and the rear wheel set.

* * * * *